United States Patent [19]

Dunn

[11] 4,000,241
[45] Dec. 28, 1976

[54] INSULATION METHOD AND MATERIALS

[76] Inventor: Daniel K. Dunn, R.R. No. 1, P.O. Box 325, Kankakee, Ill. 60901

[22] Filed: June 13, 1975

[21] Appl. No.: 586,527

[52] U.S. Cl. .................................. 264/232; 106/75; 264/122; 264/133
[51] Int. Cl.² ........................................ B29D 7/02
[58] Field of Search ................. 264/122, 232, 133; 106/75

[56] References Cited

UNITED STATES PATENTS 3,769,065   10/1973   Dunn ............................... 264/122

*Primary Examiner*—Donald J. Arnold
*Assistant Examiner*—John Parrish
*Attorney, Agent, or Firm*—David D. Kaufman

[57] ABSTRACT

Expanded perlite particles and vermiculite particles are treated with an acid solution and then with waterglass. The moist material is introduced into any insulating cavity and allowed to dry, whereupon it self-adheres into a solid insulating sheet which also adheres to the surrounding cavity surfaces. The moist material is also used to make molded articles which are then treated further with an acid solution to render them stable.

9 Claims, No Drawings

INSULATION METHOD AND MATERIALS

This invention relates to fireproofing and insulation of buildings and other structures and more particularly to the use of expanded perlite and vermiculite for accomplishing those objectives.

The search for new or improved thermal and sound insulating materials of construction is never ending. Many factors, such as, cost, natural availability, weight, toxicity, ease of application, ease of handling and storing, etc., must be considered regarding any insulating material in addition to its ultimate insulating characteristics. Thus, for example, asbestos is considered toxic and particularly when sprayed. Materials like glass-wool sheets have limited fireproofing value particularly as regards wooden structural members like studs and joists. Plaster is prohibitively expensive as a solid wall or ceiling material and also has poor sound insulating properties. In short, all known insulating materials will be found to be feasible only for certain applications because of obvious limitations of the type alluded to.

Principal objects of my invention are to provide new insulation material and a method of making and using the same in construction applications which overcome or greatly reduce the effects of many of the problems alluded to above.

In my U.S. Pat. No. 3,769,065, I described the highly desirable characteristics of expanded perlite while at the same time pointing out some of its shortcomings and the difficulties encountered when attempting to use this material for structural purposes. Considerable efforts have been made in recent years to more fully utilize and realize the recognized potential of expanded perlite. To my knowledge, however, the problem of utilizing expanded perlite as a general insulating material of construction has heretofore defied solution.

It is, therefore, another principal object of the invention to provide a method and materials of the character described utilizing expanded perlite. A related object is to provide such a method and materials in which naturally occurring vermiculite may likewise be employed.

Another object is to provide an insulation method and materials of the character described in which the insulation material is self-packing and self-adhering and likewise has the ability to adhere to any surface against which it is applied, such as metal lathing or wood panelling or wall studs.

A further object is to provide an insulation method and materials of the character described in which the insulation material may be readily applied to fill an area, as by auger, trowel or pouring, and may also be conveniently and inexpensively molded into masonry blocks or the like. A related object is to provide such a method and materials wherein the material may be freely applied to fill any cavity or form and will then set, without further treatment, to form a solid insulating sheet.

Still another object is to provide an insulation method and materials of the character described in which the insulation material may be made in bulk and conveniently stored for future use, at which time it may be applied and used without further treatment.

In my said earlier patent, I disclosed a method of coating expanded perlite to enhance its physical characteristics for construction purposes. Generally, that method comprised the treatment of expanded perlite particles with an acid, then with waterglass, and then again with an acid to obtain a substantially neutral and highly stable material. The treated perlite was then heat-dried and used immediately or, if desired, stored for future use in a number of different applications. Those materials were particularly well suited for molding, under high pressure, into acoustical tiles and construction blocks for outdoor use or where weathering was a consideration.

Continued work and experience with these materials has led to the discovery that the coated perlite particles are unexpectedly capable of new and desirable uses when in a moist and/or chemically unstable condition. Accordingly, the invention teaches coating expanded perlite, and also vermiculite, in a manner somewhat similar to that disclosed in the patent, but stopping at an intermediate stage before all of the steps described there are completed. The thus partially treated and moist material is then used immediately or bagged, under conditions which prevent loss of moisture, for future use.

The invention also teaches the use of the treated, but unstable, perlite and vermiculite in two basic type of applications. Firstly, the free-flowing material is applied to cavities and allowed to air dry, whereupon it forms a solid insulating sheet. Secondly, the material is poured into, or applied to, a mold and pressed into the desired form, whereupon it is then treated further to render it chemically stable.

To practice the method, I begin with dry and untreated expanded perlite particles or vermiculite particles. These materials are commercially available in various grades and particle sizes, such as, Johns-Mansville's PA 3 expanded perlite and Silbrico's "Krum" expanded perlite.

The particles first are moistened with an aqueous acid solution, preferrably applied by spraying. For purposes of uniformity, it is desirable that each particle be moistened with the acid solution. Accordingly, the acid solution may be sprayed onto the particles while they are being tumbled, as in a rotary mixer or, while moving on a spray conveyor of the type shown in my aforesaid patent.

Numerous acids, both organic and mineral, may be employed with good results. For example, any of the acids listed in my said patent have proved satisfactory, but the preferred acid is acetic, varying in concentration from 1 to 40 percent by weight. The amount of acid solution used will vary depending on the grade of the beginning particles (e.g., fine to coarse), but will be within the range of 20 to 30 ounces per cubic foot of particles.

After moistening with the acid, the tumbling particles are next sprayed with an aqueous sodium silicate solution, commonly known as waterglass. This, too, is a commercially available product which comes in various grades, such as, Grade JW 25 and Grade 40 of Diamond Chemical Co. Sufficient waterglass solution is used to coat every particle, and I have found this to be in the range of ½ to 1 gallon of solution per cubic foot of material.

After the two successive spray treatments described, the material is still free-flowing, although slightly moist to the touch, and substantially dust-free. Chemically and physically, it is unstable, apparently because the neutralization reaction between the silicate and the acid and the gelling between particles which results are both only partial and incomplete. Notwithstanding this instability, I have discovered that the material in this state is capable of unexpected uses and remarkable results.

The material may be used immediately or it may be packaged in airtight or waterproof containers, such as bags of various plastics, for future use. I have found that the treated material stored in plastic bags for a period of months has retained its moisture content and is therefore equally effective for the uses to be described as freshly made material.

For building applications, the moist material may be fed, through a top opening, into the cavity between wall panels and a pair of studs until the cavity is filled. Without any further packing or treatment, the material is simply allowed to air dry. Depending upon the ambient temperature, the outer shell of particles will dry and bond together in around 12 hours, while the center or core of the mass will require about 2 to 3 weeks for complete drying and bonding where the mass is over three inches thick. In any case, the dried mass forms a solid insulating sheet which is permanently fixed and will not settle or contract further. In addition, the sheet is bonded permanently to the wall panelling and the studs.

Tests indicate that the insulation sheet described provides an ultimate fire guard to prevent spread of fire from room to room or floor to floor. When 2 × 4 inch wall studs are surrounded on either side with the insulation sheets, the wooden studs will only burn about ⅜ inch into the exposed faces before the flame is actually snuffed out. When the insulation sheet is filled between wall studs and covered with wood panelling, that panelling has been found to have an increased fire resistance from a normal 6 minutes up to as much as 40 minutes. Moreover, the insulating sheet provides excellent sound insulation because of the air-entrapping nature of the particles. The insulating sheet itself may be considered completely fire resistant under ordinarily foreseeable conditions because temperatures of about 1500° F merely improve the bond between the particles and higher temperatures over about 3000° F will start to melt the particles to form a solid, glass-like shield.

It may be theorized that the self-packing and adhesive quality of the moist treated material results from a continuation of the gelling process caused or activated by further evaporation of moisture. The insulating sheet itself is also classified as unstable, that is, it will be or can be reactivated by water, despite the fact that the particles are well bonded. Obviously, however, moisture such as high humidity will not have a deteriorating effect, but only serve to enhance the bonding and adhesive characteristics. Actually, the unstable condition is beneficial because the insulation sheet may be broken or cracked accidentally or intentionally by man-made cuts. In such cases, the sheet may be restored or repaired by adding a small amount of water to the affected area to reactivate the bonding and adhesive actions.

Another construction use for the moist, unstable material is as a core filler for masonry blocks. It is well known that masonry blocks "breathe" because of their porosity. When such a block is filled with the material of the invention and allowed to dry the material sets permanently and adheres to the block. The core will not settle thereafter and the result is a masonry block with greatly improved thermal, sound and moisture insulating characteristics.

Other construction uses for the material of the invention include insulating sheets for fire doors, furnaces, trucks, water heaters, cryogenic tanks, and the like.

I have discovered still other uses for the inventive material as the insulating lining or sheet in various heatgenerating home appliances. Thus, for example, the material may be injected or packed into the insulating cavity of flat irons, toasters, ovens, broilers, and the like. In all of these applications, the instability of the material is an advantage because the sheet which is formed adheres most firmly to the encasing metal layers.

As indicated above, the moist, treated material has been found efficacious for a second type of application wherein it is molded or pressed into a desired form and then treated further to render it stable. Examples of such applications are acoustical or decorative blocks, insulation bricks, fire blocks, pipe insulation, and the like.

According to this method, the moist material is packed into the mold under very low pressures ranging from 5 to 100 pounds per square foot. The packed material is then heated to remove moisture, hasten the gelling action, and set the form. This will require temperatures ranging from 300° F to 700° F for a period of about 20 minutes. The mold may be treated with any suitable release agent to insure easy removal of the article therefrom.

The molded or formed product is then treated with an aqueous acid solution which may be the same as that used in the initial moistening spray and, preferrably, comprises acetic acid ranging in concentration from 15 to 30 percent by weight. The amount of acid solution required is about one-half to one gallon per cubic foot of molded material. This acid wash may be applied by spraying or pouring, and serves to neutralize the remaining alkali in the material. After baking or air-drying to substantial dryness, the product is chemically and physically stable and resistant to the effects of moisture, temperature and weathering.

To illustrate the thermal insulating qualities of the molded articles, I have conducted heat tests with a rectangular fire block 8 × 5 × 3 inches thick made as described and allowed to air dry. A butane flame, temperature around 2000° F, was applied directly to one face of the block continuously for a period of 6 hours. Temperature readings were taken at different points through the thickness of the block. At the point of the flame, the block face had a small area of red glow but did not ignite or smoke. One inch into the block, the temperature after 6 hours stabilized at around 725° F. At a test point 1¾ inches into the block, the temperature stabilized at around 225° F. On the opposite face, three inches from the flame, the temperature was substantially constant around 75° F.

What I claim is:
1. A method of forming solid and permanently fixed insulation (An insulation method) characterized by the steps of:
   first applying to particles from a group consisting of expanded perlite and vermiculite an aqueous acid solution;
   next applying to the moistened particles an aqueous solution of water glass; and
   introducing the moistened particles into he insulating cavity,
   said acid solutions being selected from a group consisting of acetic, hydrochloric, phosphoric, nitric, sulfuric, boric, formic, propionic, malic and citric acids, the concentrations and proportions of said acid and waterglass solutions, to each other and to the untreated particles, being effective so that, upon drying, the particles form into a solid mass by adhering to one another and to the surrounding retaining surfaces.

2. A method according to claim 1 wherein said acid and waterglass solutions are sprayed onto the particles while in motion.

3. A method according to claim 1 wherein said acid solution consists of acetic acid having a concentration of from 1 to 40 percent by weight.

4. A method according to claim 3 wherein the amount of acetic acid solution is 20 to 30 ounces per cubic foot of particles.

5. A method according to claim 4 wherein the amount of waterglass solution is one-halft to one gallon per cubic foot of particles.

6. A method of molding construction articles characterized by the steps of:
   first applying to particles from a group consisting of expanded perlite and vermiculite an aqueous acid solution;
   next applying to the moistened particles an aqueous solution of waterglass;
   packing the moistened particles into a mold;
   heating the packed particles to drive off moisture therefrom and form the article; and
   then treating the formed article with an aqueous acid solution,
   said acid solutions being selected from a group consisting of acetic, hydrochloric, phosphoric, nitric, sulfuric, boric, formic, propionic, butanoic, malic, and citric acids,
   the concentrations and proportions of said acid and waterglass solutions, to each other and to the untreated particles, being effective so that, upon drying, the formed article is chemically and physically stable.

7. A method according to claim 6 wherein the acid and waterglass solutions in the first and second steps are sprayed onto the particles while in motion.

8. A method according to claim 6 wherein:
   the acid solution of step one consists of acetic acid having the concentration of 1 to 40 percent by weight and the amount is 20 to 30 ounces per cubic foot of particles; and
   the amount of waterglass solution is one-half to one gallon per cubic foot of particles.

9. A method according to claim 8 wherein the acid solution of step five consists of acetic acid having a concentration of 15 to 30 percent by weight and the amount is one-half to one gallon per cubic foot of molded particles.

* * * * *

UNITED STATES PATENT OFFICE
CERTIFICATE OF CORRECTION

Patent No. 4,000,241     Dated December 28, 1976

Inventor(s) Daniel K. Dunn

It is certified that error appears in the above-identified patent and that said Letters Patent are hereby corrected as shown below:

Column 4, line 55, "(An insulation method)" should be deleted.

Signed and Sealed this

Third Day of May 1977

[SEAL]

Attest:

RUTH C. MASON
*Attesting Officer*

C. MARSHALL DANN
*Commissioner of Patents and Trademarks*